United States Patent [19]

Okuda et al.

[11] 4,046,988

[45] Sept. 6, 1977

[54] METHOD OF PREVENTING BASE METAL END CRACK IN ARC WELDING AND END TAB USED THEREFOR

[75] Inventors: Naoki Okuda, Fujisawa; Kazuo Tanaka, Yokosuka, both of Japan

[73] Assignee: Kobe Steel Ltd., Kobe, Japan

[21] Appl. No.: 664,272

[22] Filed: Mar. 5, 1976

[51] Int. Cl.² ............................................. B23K 9/32
[52] U.S. Cl. .............................. 219/137 R; 219/136
[58] Field of Search ............... 219/73 R, 136, 137 R, 219/121 R

[56] References Cited

U.S. PATENT DOCUMENTS

| | | | |
|---|---|---|---|
| 1,512,787 | 10/1924 | Morton | 219/137 R |
| 2,649,528 | 8/1953 | Koenig et al. | 219/137 R |
| 3,838,496 | 10/1974 | Kelly | 219/137 R X |

FOREIGN PATENT DOCUMENTS 12,649  9/1967  Japan ................. 219/137 R

*Primary Examiner*—Bruce A. Reynolds
*Assistant Examiner*—N. D. Herkamp
*Attorney, Agent, or Firm*—Oblon, Fisher, Spivak, McClelland & Maier

[57] ABSTRACT

A method of preventing base metal end cracks in arc welding characterized by the adaptation of an end tab having three protuberant portions on its end contacting the base metal, wherein the protuberant portions at both ends of the end tab are positioned in abutment on the parts of the base metal which are on both sides of the groove line where the welding arc and the weld metal are not directly contacted, while the protuberant portion in the center is positioned on an extension of the groove line, and welding is carried out with the end tab secured to the welding end of the base metal.

5 Claims, 6 Drawing Figures

METHOD OF PREVENTING BASE METAL END CRACK IN ARC WELDING AND END TAB USED THEREFOR

BACKGROUND OF THE INVENTION

1. Field of the Invention

This invention relates to a method of preventing cracks which might develop at the terminal end of the welding base metal during arc welding, and to an end tab used therefor.

2. Description of the Prior Art

Lately, various types of automatic welding systems have been devised and practically used for increased efficiency of welding works, and most popular among such automatic welding methods is the so-called "submerged arc welding" method which is practiced at high speed and with high heat input. This welding method is high in efficiency, but as a great quantity of heat is applied to the weld zone, which moves at high speed, much thermal stress or strain is liable to occur along the welded joint, and occurrence of such thermal stress or strain is proportionate to the heat input. Particularly, in the case of welding practiced by adapting a crater treating end tab at the termination of the weld line, when the arc point directed toward the end tab passes the terminal end of the base metal, repression on that portion is momentarily released and rapid rotational deformation is caused by the stress produced by accumulated thermal expansion, resulting in development of an end crack. The change of development of such cracks is high in single groove automatic welding where 100% weld penetration is made from one side alone. Various methods such as mentioned below have been proposed for preventing development of such end cracks.

According to one of such proposed methods, welding is carried out not from one direction alone, but from both ends of the base metal, so as to re-weld the crater portion. This method, however involves the necessity of changing the welding direction and performing gauging along the crater joint. According to another method, the groove near the terminal end of the base metal is first filled by hand welding, so as to eliminate the need for 100% penetration all the way to the terminal end. According to this method, however, the terminal end portion where the groove is filled must be gauged from the back side and the portion where no back bead is present must be welded. Thus, any of these known methods requires troublesome work and extra time and labor therefor.

In the conventional automatic welding methods of the type in which 100% penetration is achieved all the way to the terminal end and an end tab for treating the crater is adapted at the termination of the weld line of the base metal to relieve the crater from the base metal to the end tab, it was impossible to perfectly prevent development of the cracks at the terminal end of the base metal. This is attributable to the face that, as aforesaid, shape and intense rotational deformation is caused at the terminal end of the base by thermal stress or strain when the welding electrode passes such portion. In order to prevent such rotational deformation, it is proposed to curb the end portion of the base metal by means of a crater treating end tab mounted at said portion or by mechanically giving a restrictive force or holdback to the end tab. However, in case an end tab alone is used for providing such curb or holdback, a considerably large-sized end tab must be mounted and if the end tab used is not sufficiently large, the end tab itself may undergo rotational deformation to cause development of an end crack when the end tab receives welding heat from the welding electrode upon arrival of the latter at a position just above the end tab. It is indeed possible to restrain the terminal end of the base metal by giving a mechanical restrictive force to the end tab itself, but, in such a case, an angular deformation of the base metal could take place during welding, and it is hard to impart a stable compressive force laterally to the weld zone. It is thus hardly possible to obtain a stable restrictive force sufficient to prevent development of end cracks.

According to still another method proposed in Japanese Patent Publication No. 15146/1974, the terminal portion of the base metal is not perfectly restrained, but there is adapted a crater treating end tab which is capable of preventing rapid thermal deformation that could take place when the welding electrode passes said terminal portion. In this method, in order to prevent the terminal portion of the base metal from being rapidly opened out by thermal strain produced when the welding electrode passes thereover, the crater treating end tab is provided separately from the curbing end tab so as to shut off thermal stress or strain caused by heat given to the crater treating end tab, thereby to avoid rapid lowering of the restrictive force of the curbing end tab to prevent end cracks. When the welding electrode passes the terminal end portion of the base metal, there takes place at such portion a sharp thermal deformation, or so-called "rotational deformation", which involves changes in both the lateral and vertical directions relative to the weld line. In the device of said such patent, there is provided a means for giving a suitable restrictive force in the lateral direction so that no rapid lowering of restrictive force will take place, but no such restrictive force is imparted in the vertical direction at the termination of the weld line. Therefore, when the welding electrode passes the terminal end of the base metal, the area near said terminal end expands out rapidly on its side attached to the crater treating end tab and, as the restrictive force in the lateral direction is also not so strong, there takes place a deformation in the direction of rotation, resulting in development of end cracks if the heat input is large and the welding rate is high. FIG. 1 shows the configuration of an end tab according to the prior art and a condition of restriction near the terminal end of the base metal. In the arrangement shown in FIG. 1, restriction or curb in the lateral direction at the terminal end of the weld line of the base metal is provided by the weld zones 1, 2 and the end tab 3 holds the base metal while spaced away from the weld line so that it scarcely receives the influence of rapid thermal deformation produced at the terminal end of the weld line and can therefore curb the end of the base metal with a relatively stable restrictive force. However, the portion A in the vertical direction left in a perfectly free state, so that when the welding electrode passes the terminal end of the base metal, said end expands out as shown by numeral 5, owing to thermal deformation, causing movement of the crater treating section 4 to the position indicated by numeral 6. Thus, rotational deformation is caused, owing to such rapid thermal deformation and insufficient curb in the lateral direction, resulting in development of end cracks. There is also a possibility that a clearance be formed between the crater treating end tab and the terminal end of the base metal to cause falling of molten metal therefrom when the welding electrode transfers from the terminal end of the base metal to the crater treating end tab.

SUMMARY OF THE INVENTION

The present invention eliminates the aforementioned problems of the prior art. More specifically, there is provided, according to one aspect of the present invention, a method of preventing base metal end cracks in arc welding, characterized by the adaptation of an end tab at the welding end of the base metal, said end tab having three protuberant portions on its side contacted with the base metal, with the protuberant portions at both ends of the end tab being positioned in abutment on the parts of the base metal which are on both sides of the groove line and where the welding arc and the weld metal are not directly contacted, while the protuberant portion is the center is positioned on an extension of the groove line. According to another aspect of the present invention, there is provided an end tab used for such crack-free welding characterized in a tab being provided with two slits on its side contacted with the base metal, whereby three protuberant portions are formed on the side of the tab contacted with the base metal.

BRIEF DESCRIPTION OF THE DRAWINGS

The invention is now described in detail while having reference to the accompanying drawings in which like reference numerals designate like or corresponding parts, and wherein.

DESCRIPTION OF THE ILLUSTRATED EMBODIMENTS

Figure 1A:
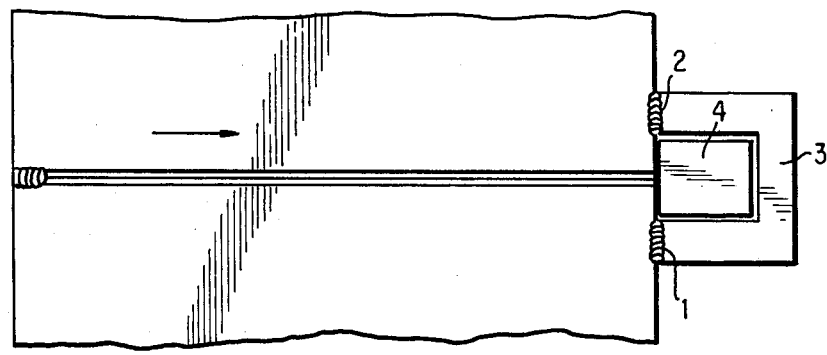
FIGS. 1a and 1b are plan views showing the configuration of an end tab of the prior art and a mode of adaptation thereof, already described.
Figure 1B:
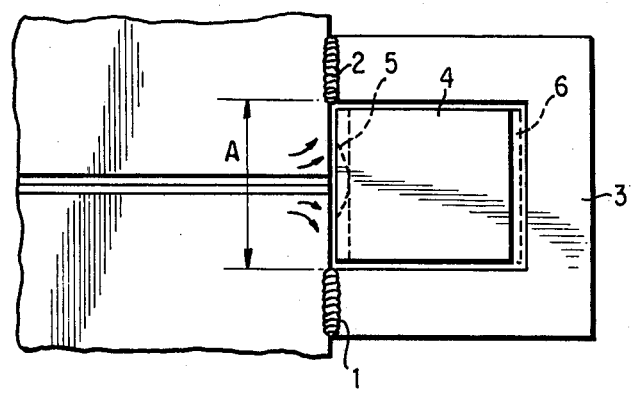

Referring now to the drawings, and more particularly to

Figure 2A:
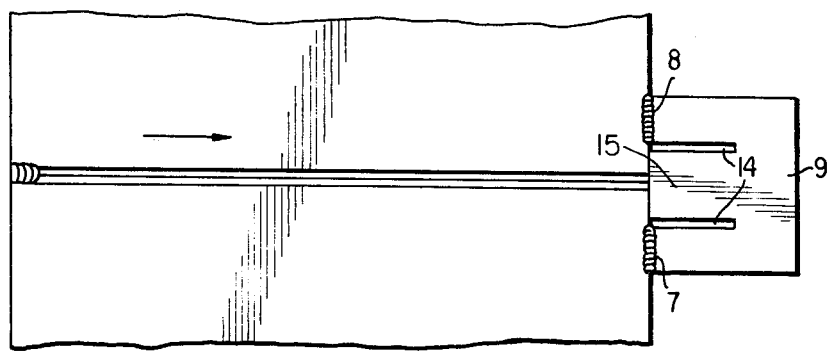
FIGS. 2a and 2b are plan views showing the configuration of an end tab according to the method of the present invention and a mode of adaptation thereof.
Figure 2B:
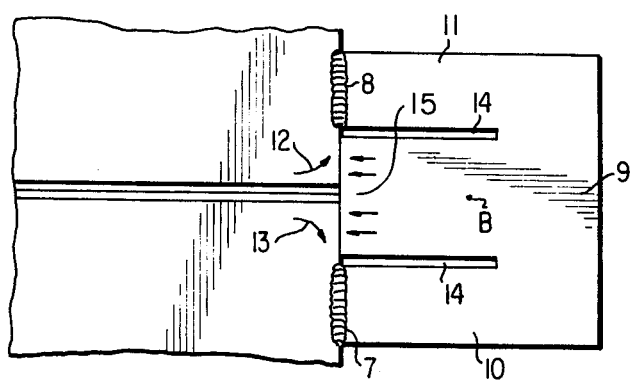

FIG. 2 which shows a base metal end crack preventing method and an end tab used therefor an end tab 9 is solidly welded to the base metal at 7 and 8 by curbed welding, with a crater treating protion 15 of the tab being kept closely attached to the terminal end of the base metal. The deformation in the lateral direction produced in the portions 12 and 13 when the welding electrode passes the terminal end of the base metal is checked by the external side of the end tab 9 at the curbed weld zones 7 and 8, while holdback in the vertical direction is provided by the crater treating portion 15 positioned in the slits 14 in the end tab 9, as shown in FIG. 2. The width of these slits can not be specified definitely because the degree of lateral expansion of the crater treating poriton 15 of the end tab 9 varies depending on the welding heat input, plate thickness and other factors, but generally, such width should not be less than 1 mm because, if it is less than 1 mm, the crater treating portion 15 of the end tab 9, when thermally expanded out with arrival of the welding electrode above the end plate, may come to contact and force out the portions 10 and 11 of the end tab 9 to thus weaken the restrictive force in the lateral direction. As for the length of the slits 14, it should extend beyond the point B at which the welding electrode rides on the end tab 9 to intersect the arc. If the slit length is shorter than the distance from tab end to point B, thermal strain in the lateral direction is allowed to transmit wholly when the welding electrode has reached the point B, resulting in a weakened lateral restrictive force at the curbed weld zones 7 and 8. If each slit 14 extends beyond the point B, thermal strain in the lateral direction is absorbed by the slit clearance to allow maintenance of the stabilized restrictive force on the terminal end of the base metal. As the crater treating portion fo the end tab 9 is set in close attachment to the terminal end of the base metal, vertical expansion of the portions 12 and 13 at the terminal end of the base metal is curbed by the crater treating portion 15 provided integral with the end tab 9 held by the curbed weld sections 7 and 8, which are unaffected by thermal strain of the terminal end of the base metal, so that such force rather acts as a compressive force to the weld zone to greatly aid in the prevention of end cracks.

Figure 3A:
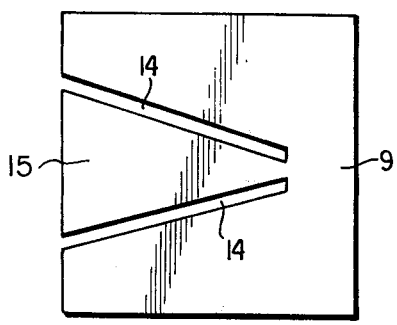
FIGS. 3a and 3b are plan views of modified forms of an end tab useable in the method of the present invention.
Figure 3B:
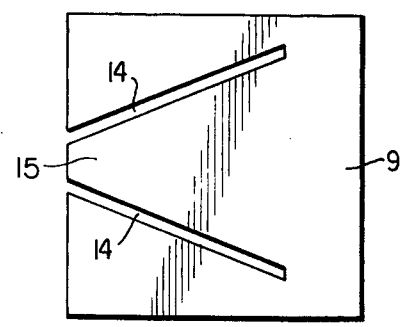

Although the slits 14 are formed parallel to each other in the end tab shown in FIG. 2, they may be arranged in other suitable configurations, such as shown in FIG. 3 (a) and (b) to obtain the same effect.

As described above in detail, the device of the present invention provides a restriction of curb in the vertical direction at the terminal end of the base metal to prevent rapid rotational deformation that would take place when the welding electrode passes the terminal end of the base metal, thereby eliminating any risk of development of end cracks.

We claim:

1. A method of preventing base metal end cracks in arc welding using an end tab having two slits defined within one lateral side portion thereof so as to in turn define three uniplanar, cantilevered protuberant portions within said one side thereof, comprising the steps of:

positioning the two end protuberant portions of said end tab against the base metal in end abutment therewith on both sides of the groove line where the welding arc and the weld metal are not directly contacted;

simultaneously positioning the center protuberant portion of said end tab against said base metal in end abutment therewith on an extension of said groove line thereof;

fixedly securing said two end protuberant portions of said end tab to the welding end of said base metal while leaving said center protuberant portion of said end tab in free end abutment with said base metal; and carrying out a welding operation on said base metal with said end tab secured thereto as characterized herein, the three protuberant portions being so dimensioned such that said deformation and expansion of said base metal is properly controlled as a result of the relative disposition of said base metal and said end tab, and the controlled expansion of said center end tab portion as permitted by said slits defined between said center and end portions of said end tab.

2. An end tab for use in arc welding for preventing base metal end cracks, comprising:

three uniplanar, cantilevered protuberant portions being disposed on one side of said end tab and being adapted to be positioned in end abutment with an end of said base metal, said protuberant portions being formed by a pair of slits provided in said one side of said end tab;

said outer protuberant portions being adapted to be fixedly secured to said base metal while said center portion is freely held in end contact with said base metal, the three proturberant portions being so dimensioned such that said deformation and expansion of said base metal is properly controlled as a result of the relative disposition of said base metal and said end tab, and the controlled expansion of said center end tab portion as permitted by said slits defined between said center and end portions of said end tab.

3. The end tab of claim 2, wherein said slits are parallel to one another.

4. The end tab of claim 2, wherein said slits converge toward one another as they progress from said one side of said end tab.

5. The end tab of claim 2, wherein said slits become farther apart as they progress from said one side of said end tab toward the opposite side thereof.

* * * * *